US 6,659,727 B2

(12) United States Patent
Major et al.

(10) Patent No.: US 6,659,727 B2
(45) Date of Patent: Dec. 9, 2003

(54) CONTROL METHOD FOR A DUAL MODE COMPRESSOR DRIVE SYSTEM

(75) Inventors: Gregory Alan Major, Beverly Hills, MI (US); George M. Claypole, Fenton, MI (US); Lawrence Ziehr, Clarkston, MI (US); Mark D. Nemesh, Troy, MI (US); Michael J. Miller, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/947,278

(22) Filed: Sep. 7, 2001

(65) Prior Publication Data

US 2003/0049133 A1 Mar. 13, 2003

(51) Int. Cl.⁷ .................................................. F04B 49/00
(52) U.S. Cl. ........................... 417/16; 417/374; 701/53; 318/152
(58) Field of Search ............................... 417/15–17, 53, 417/364, 374; 180/65.2, 65.3, 65.4, 65.7; 701/22, 53, 54; 318/139, 140, 151, 152, 432

(56) References Cited

U.S. PATENT DOCUMENTS

| | | | | |
|---|---|---|---|---|
| 3,941,012 A | * | 3/1976 | Mayer | 74/661 |
| 4,165,795 A | * | 8/1979 | Lynch et al. | 180/65 A |
| 4,846,327 A | * | 7/1989 | Mayer | 192/84 C |
| 5,105,096 A | * | 4/1992 | Waldschmidt et al. | 307/68 |
| 5,931,884 A | * | 8/1999 | Ochiai | 701/51 |
| 5,934,089 A | * | 8/1999 | Nakagawa et al. | 62/133 |
| 5,997,431 A | * | 12/1999 | Vukovich et al. | 477/48 |
| 6,230,507 B1 | * | 5/2001 | Ban et al. | 62/228.4 |
| 6,287,081 B1 | * | 9/2001 | Tamegai et al. | 417/15 |
| 6,321,143 B1 | * | 11/2001 | Phillips et al. | 701/22 |
| 6,373,206 B1 | * | 4/2002 | Morimoto et al. | 318/139 |
| 6,390,214 B1 | * | 5/2002 | Takahashi et al. | 180/65.2 |
| 6,464,608 B2 | * | 10/2002 | Bowen et al. | 475/5 |

OTHER PUBLICATIONS

Spec sheet #ZXLCVAC3TT for a Zexel/Bosch compressor with integral electric motor, dated Dec. 14, 1999.

* cited by examiner

Primary Examiner—Timothy S. Thorpe
Assistant Examiner—Han L Liu
(74) Attorney, Agent, or Firm—Christopher DeVries

(57) ABSTRACT

An improved control method for a dual mode compressor drive arrangement selectively operates an electric machine coupled to the compressor as a motor or a generator during operation of an engine coupled to the compressor for improved efficiency and performance. The machine is operated as a generator to increase the available power for vehicle electrical loads when compressor operation is not needed or when the engine is driving the compressor. Conversely, the machine is operated as a motor to drive the compressor under heavy engine loading or when the engine speed is outside a desired operating range defined in terms of compressor speed.

10 Claims, 2 Drawing Sheets

CONTROL METHOD FOR A DUAL MODE COMPRESSOR DRIVE SYSTEM

TECHNICAL FIELD

This invention relates to the control of a dual mode drive arrangement for an automotive refrigerant compressor.

BACKGROUND OF THE INVENTION

Dual mode compressor drive arrangements have been utilized to maintain continuous climate control operation in automotive powertrains, with the dual mode drive arrangement allowing a refrigerant compressor of the climate control system to be selectively driven by the powertrain internal combustion engine or an electric motor. For example, the engine may be coupled to the compressor drive shaft through an electromagnetic clutch, and the armature of the electric motor may be coupled to (or integral with) the compressor drive shaft. Typically, the drive arrangement is configured so that the compressor is driven by the engine when the engine is running, and by the electric motor when the engine is not running. For example, if the engine is turned off under idle conditions to reduce fuel consumption, the electric motor may be activated to prevent interruption of the compressor drive. Similar considerations occur in hybrid powertrain configurations where the vehicle is selectively driven by an engine or an electric drive motor, or where an engine is intermittently operated to provide supplemental electric power to an electric drive motor.

SUMMARY OF THE INVENTION

The present invention is directed to an improved control method for a dual mode drive arrangement coupling a climate control compressor to an electric machine and an engine, where the engine is turned on and off during operation of the vehicle, and where the electric machine is selectively operated as a motor or a generator during operation of the engine for improved efficiency and performance. In a preferred embodiment, the machine is operated as a generator to increase the available power for vehicle electrical loads when compressor operation is not needed or when the engine is driving the compressor. Conversely, the machine is operated as a motor to drive the compressor under heavy engine loading or when the engine speed is outside a desired operating range defined in terms of compressor speed.

DESCRIPTION OF THE PREFERRED EMBODIMENT

Figure 1:
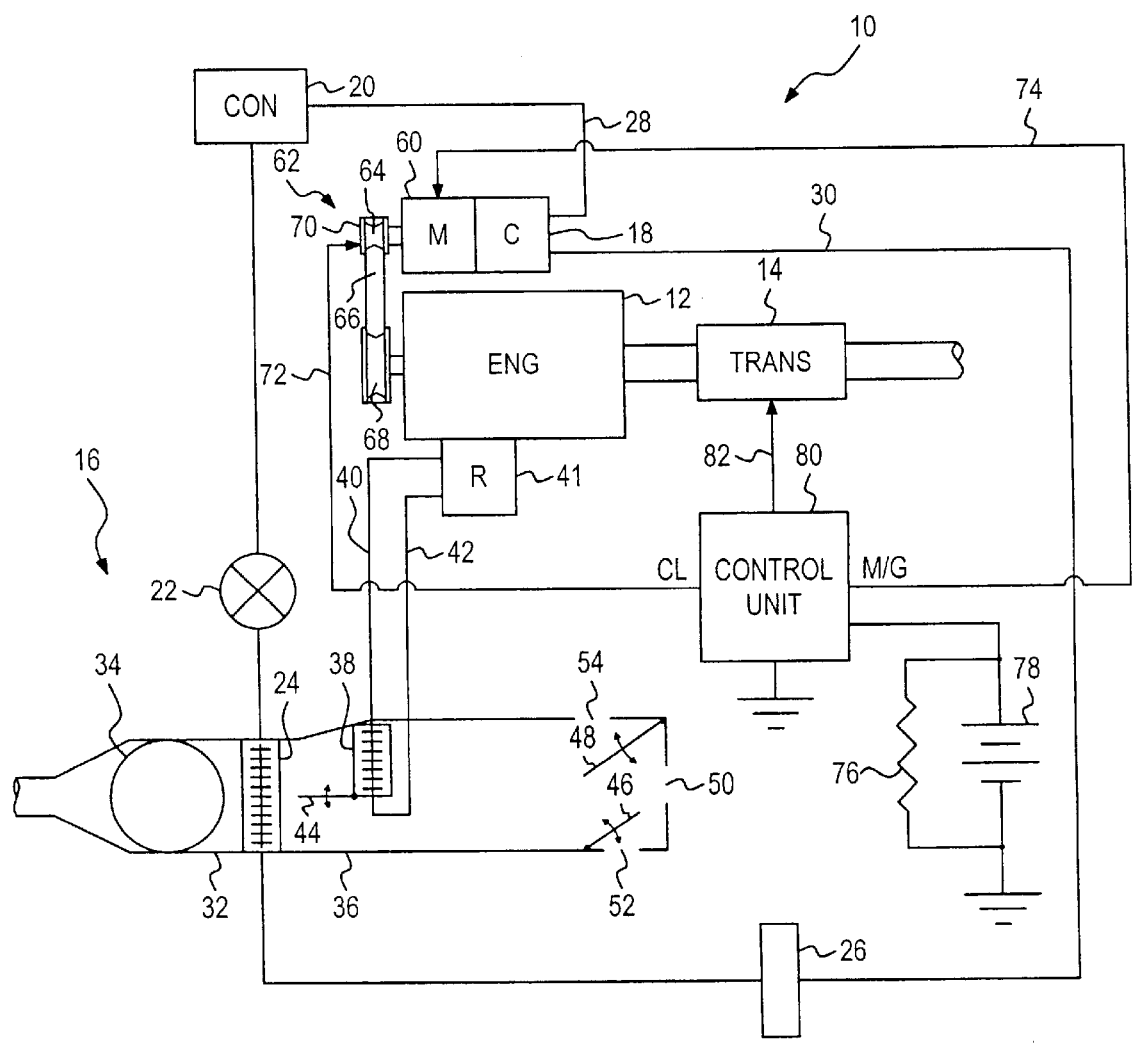
FIG. 1 is a schematic diagram of a motor vehicle powertrain including an engine, a refrigerant compressor having a dual mode drive arrangement, and a microprocessor-based control unit programmed to carry out the control of this invention.

Referring to the drawings, and particularly to FIG. 1, the control of this invention is illustrated in the context of a vehicle powertrain 10 including an engine (ENG) 12 coupled to drive a vehicle through a multiple speed ratio automatic transmission (TRANS) 14, where the vehicle is equipped with a heating, ventilating and air conditioning (HVAC) system 16 in which engine coolant is used to heat the vehicle cabin and an air conditioning system is used to cool the vehicle cabin. However, the control of this invention is also applicable to other powertrain arrangements, including hybrid configurations where an electric motor is coupled to the vehicle drive wheels, and other HVAC systems such as a reversible cycle heat pump that is operated to selectively heat or cool the vehicle cabin.

Referring to FIG. 1, the HVAC system 16 includes a refrigerant compressor 18, a condenser (CON) 20, an orifice tube 22, an evaporator 24, and an accumulator/dehydrator 26 arranged in order between the compressor discharge line 28 and the compressor suction line 30. The condenser 20 cools the compressed refrigerant, and the orifice tube 22 allows the cooled refrigerant to expand before passing through the evaporator 24. The accumulator/dehydrator 26 separates low pressure gaseous and liquid refrigerant, directs a gaseous portion to the compressor suction line 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted upstream of the TXV to ensure that sub-cooled liquid refrigerant is supplied to the inlet of the TXV. An air intake duct 32 disposed on one side of evaporator 24 houses an inlet air blower 34 to force air past the evaporator tubes, and an air outlet duct 36 disposed on the downstream side of blower 34 and evaporator 24 houses a heater core 38 formed as an array of finned tubes that conduct engine coolant supplied from an engine coolant reservoir (R) 41 via lines 40 and 42. The heater core 38 effectively bifurcates the outlet duct 36, and a re-heat door 44 is adjustable as shown to control how much of the air must pass through the heater core 38. The heated and unheated air portions are mixed in outlet duct 36 downstream of re-heat door 40, and a pair of mode control doors 46, 48 direct the mixed air through one or more outlets 50, 52, 54.

The compressor 18 is mechanically driven by a dual mode drive arrangement including an electric machine (M) 60 and a clutched belt drive mechanism 62. The belt drive mechanism 62 includes a drive pulley 64, a belt 66 coupling the drive pulley 64 to an engine crank pulley 68, and an electromagnetic clutch 70 that is selectively activated via line 72 to couple the drive pulley 64 to a drive shaft of compressor 18. When the engine 12 is turned off to conserve fuel or to reduce exhaust emissions, the clutch 70 is disengaged, and continued operation of the HVAC system 16 can be maintained by activating the electric machine 60 in a motoring mode via line 74 to drive the compressor 18. When the engine 12 is running, the electric machine 60 is ordinarily deactivated, and the clutch 70 is activated as required to allow the engine 12 to drive compressor 18 through pulley mechanism 62. Under certain conditions, however, the compressor 18 may be driven by electric machine 60 during operation of engine 12; this ensures that the compressor 18 is driven at an appropriate speed and reduces engine loading. Under certain other conditions, the electric machine 60 may be activated in a generating mode during engine operation; this generates supplemental electrical power that can be used to operate vehicle electrical loads 76 and/or to charge the vehicle storage battery 78.

Figure 2:
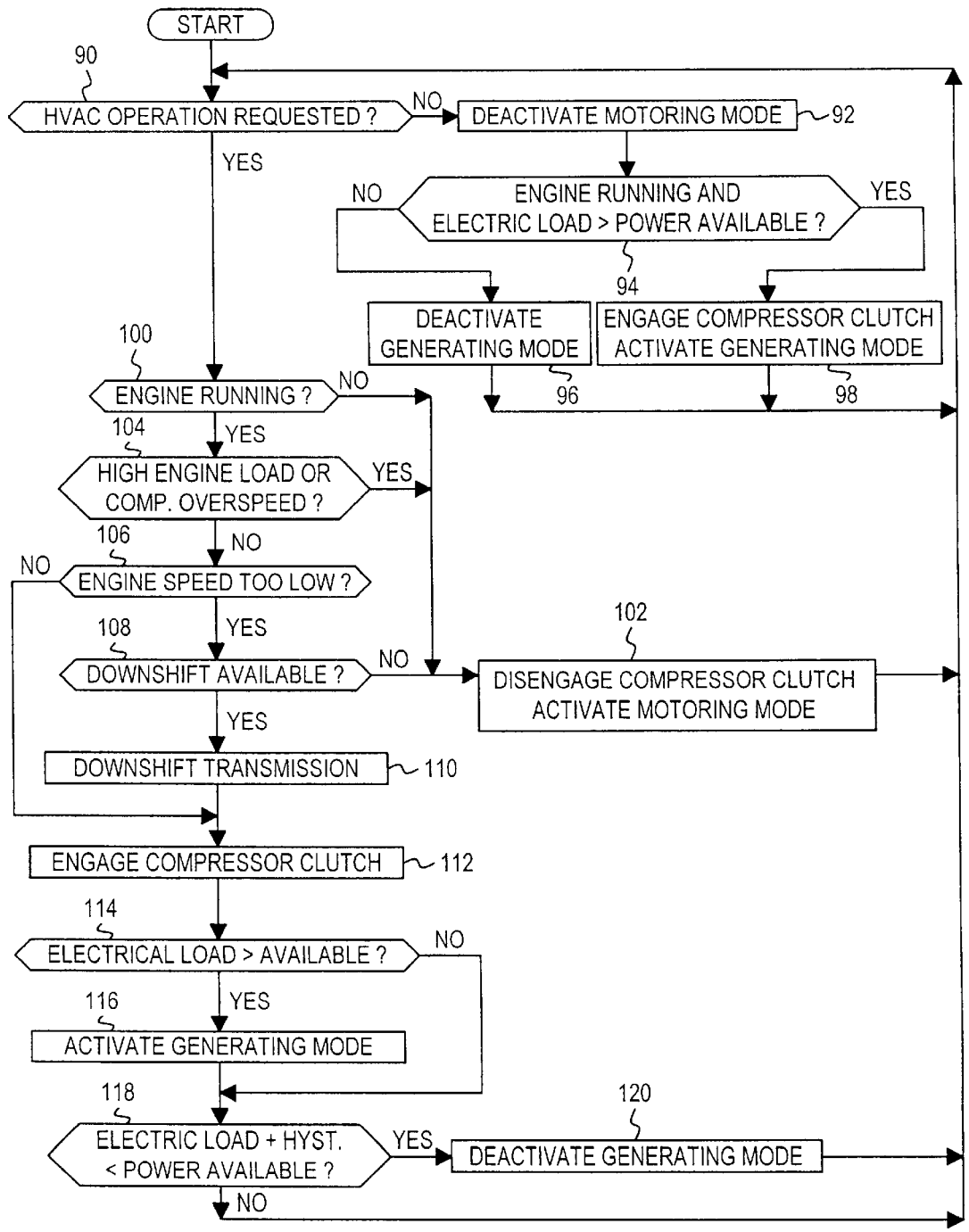
FIG. 2 is a flow diagram representative of a computer software routine executed by the control unit of FIG. 1 in carrying out the control of this invention.

The above-described control is carried out by a microprocessor-based control unit 80 programmed to execute a software routine based on the flow diagram of FIG. 2. Thus, the control unit 80 is coupled to storage battery 78, and controls the electric machine 60 and electromagnetic clutch 70 via lines 74 and 72, respectively. Additionally, the control unit 80 is coupled to transmission 14 via line 82 to influence transmission shifting, as explained below.

Referring to the flow diagram of FIG. 2, the control unit 80 first executes block 90 to determine if cabin heating or cooling by the HVAC system 16 is requested. If not, the motoring mode of machine 60 is discontinued by block 92, and block 94 is executed to determine if the engine 12 is running and the electric load demand exceeds the available power being produced by an engine-driven generator (not shown). Block 96 deactivates the generating mode of machine 60 if block 92 is answered in the negative, while block 98 engages the compressor clutch 70 and activates the generating mode to produce supplemental electric power for the loads 76 if block 92 is answered in the affirmative. It is noted that engaging the clutch 70 also drives compressor 18, even though HVAC operation has not been requested; in this case, the re-heat door 44 can be adjusted to maintain the vehicle cabin temperature, and the capacity of compressor 18 can be minimized through the use of a bypass mechanism (not shown) or by adjusting its capacity directly if compressor 18 is a variable stroke compressor.

If the control unit 80 determines at block 90 that HVAC operation is requested, the blocks 100–120 are executed to engage the best compressor drive mode, and to activate the machine 60 in either motoring or generating mode. If the engine 12 is not running, as determined at block 100, the block 102 disengages the compressor clutch 70 and activates the motoring mode of machine 60 to provide the requested HVAC operation. The blocks 104, 106 and 108 also direct the execution of block 102 when the engine 12 is running if: (1) there is heavy engine loading, (2) the compressor 18 is being driven at an excessive speed, or (3) the engine speed is too low to provide adequate HVAC performance and transmission downshifting will not alleviate the problem. If transmission downshifting is available and will increase the compressor speed, as determined at block 108, the block 110 provides a downshift signal to transmission 14 via line 82. If the above-mentioned conditions are not detected or the transmission is downshifted to provide adequate compressor speed, the block 112 engages the compressor clutch 70, and the blocks 114–120 determine if machine 60 should be operated in the generating mode to develop supplemental electric power. If block 114 determines that the electric load demand exceeds the available power being produced by the engine-driven generator, the generating mode is activated by block 116 until the combined power produced by machine 60 and the engine driven generator exceeds the electric load demand by at least a hysteresis amount HYST, whereupon block 120 deactivates the generating mode.

In summary, the control of this invention takes full advantage of the dual mode drive system 62, allowing both the HVAC system 16 and powertrain 10 to operate as efficiently as possible, with excellent temperature control of the vehicle cabin. While described in reference to the illustrated embodiment, it is expected that various control modifications will occur to those skilled in the art, particularly when the control is applied to different powertrain and HVAC configurations. For example, it is possible that the machine 60 may also be used for engine cranking, if desired. Accordingly, it will be understood that the scope of this invention is not limited to the illustrated embodiment, and that control methods incorporating such modifications may fall within the scope of this invention, which is defined by the appended claims.

What is claimed is:

1. A control method for a motor vehicle dual mode drive mechanism selectively coupling a refrigerant compressor, an electric machine and an engine, where the engine is turned on and off during operation of the vehicle, the control method comprising the steps of:
    operating the electric machine as a generator to develop supplemental electrical power for the vehicle while the engine is coupled to the electric machine through said dual mode drive mechanism if auxiliary electric power generation is desired;
    during operation of said engine, determining if driving of the compressor by said engine is not desired;
    operating the electric machine for engine cranking following an engine shut off; and
    operating the electric machine as a motor to drive the compressor through said dual mode drive mechanism during operation of said engine if it is determined that driving of the compressor by said engine is not desired.

2. The control method of claim 1, including the step of:
    operating the electric machine as a motor to drive the compressor through said dual mode drive mechanism during operation of said engine if a load of said engine exceeds a predetermined load.

3. The control method of claim 1, including the step of:
    operating the electric machine as a motor to drive the compressor through said dual mode drive mechanism during operation of said engine if a speed of said engine is outside a desired operating range corresponding to a desired speed range of said compressor.

4. The control method of claim 1, wherein the engine is coupled to drive the vehicle through a multiple speed ratio transmission, including the step of:
    detecting a condition where a speed of said engine is below a desired operating range corresponding to a desired speed range of said compressor; and
    when said condition is detected, shifting the transmission to a new speed ratio to bring the engine speed into said desired operating range.

5. A compressor system for a vehicle comprising:
    an internal combustion engine;
    a belt and pulley system coupled to said internal combustion engine;
    a clutch coupling said belt and pulley system to an electric machine, said electric machine driven by said belt and pulley;
    a compressor coupled to said electric machine;
    wherein said electric machine is coupled to said belt and pulley system to rotate said compressor;
    wherein said electric machine operates said compressor independent of said internal combustion engine in a decoupled state from said belt and pulley system;
    wherein said electric machine operates as a generator while engaged to said belt and pulley system; and
    wherein said electric machine initiates engine cranking to activate said internal combustion engine.

6. The compressor system of claim 5 further including a transmission coupled to said internal combustion engine, wherein said transmission is downshifted to increase the speed of rotation of said electric machine and said compressor.

7. The compressor system of claim 5 wherein said clutch is an electromagnetic clutch.

8. A method for controlling a refrigerant compressor in a vehicle comprising:

providing an internal combustion machine;

providing an electric machine;

operatively connecting the internal combustion machine and the electric machine with a clutch;

coupling the electric machine to the refrigerant compressor;

operating the electric machine as a generator to develop supplemental electrical power for the vehicle while the engine is coupled to the electric machine through the clutch;

during operation of the internal combustion engine, determining if driving of the electric machine by the internal combustion engine is not desired;

operating the electric machine as a motor to drive the compressor independent of operation of the internal combustion engine by releasing the clutch; and starting the internal combustion engine with the electric machine.

9. The method of claim 8 further comprising increasing the speed of the compressor by downshifting a transmission coupled to the internal combustion engine.

10. The method of claim 8 further comprising upon release of the clutch controlling the speed of the electric machine with a controller.

* * * * *